US008586221B2

(12) United States Patent
Seo et al.

(10) Patent No.: US 8,586,221 B2
(45) Date of Patent: *Nov. 19, 2013

(54) RECHARGEABLE BATTERY WITH PROTECTIVE CIRCUIT BOARD LEAD PLATES CONNECTION

(75) Inventors: Kyungwon Seo, Suwon-si (KR); Jeongdeok Byun, Suwon-si (KR); Yonggeol Kwon, Suwon-si (KR); Seok Koh, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 905 days.

This patent is subject to a terminal disclaimer.

(21) Appl. No.: 12/588,303

(22) Filed: Oct. 9, 2009

(65) Prior Publication Data
US 2010/0092860 A1 Apr. 15, 2010

Related U.S. Application Data

(63) Continuation-in-part of application No. 12/007,363, filed on Jan. 9, 2008, now Pat. No. 7,811,686.

(30) Foreign Application Priority Data

Jan. 17, 2007 (KR) .................. 10-2007-0005431

(51) Int. Cl.
*H01M 10/48* (2006.01)
(52) U.S. Cl.
USPC ............................... 429/92; 429/7; 429/175
(58) Field of Classification Search
USPC ........................................... 429/148
See application file for complete search history.

(56) References Cited

U.S. PATENT DOCUMENTS

| 6,861,821 | B2 | 3/2005 | Masumoto et al. |
| 7,429,432 | B2 | 9/2008 | Kozu et al. |
| 7,642,007 | B2 | 1/2010 | Tamai et al. |
| 7,811,686 | B2 * | 10/2010 | Seo et al. ........................ 429/7 |
| 7,811,868 | B2 * | 10/2010 | Kim et al. ..................... 438/151 |
| 8,334,063 | B2 * | 12/2012 | Kwag et al. ....................... 429/7 |
| 2003/0003357 | A1 | 1/2003 | Tamai et al. |
| 2003/0077486 | A1 | 4/2003 | Iwaizono et al. |
| 2005/0151514 | A1 | 7/2005 | Kozu et al. |

(Continued)

FOREIGN PATENT DOCUMENTS

| CN | 1465109 A | 12/2003 |
| JP | 2000-048802 | 2/2000 |

(Continued)

*Primary Examiner* — Patrick Ryan
*Assistant Examiner* — Lucas J. O'Donnell
(74) *Attorney, Agent, or Firm* — Robert E. Bushnell, Esq.

(57) ABSTRACT

A rechargeable battery constructed with a bare cell, a protective circuit board electrically connected to the bare cell, a lead plate operationally connecting the bare cell and the protective circuit board, and a combining case covering an upper end of the bare cell, the protective circuit board and the lead plate. The lead plate is constructed with a first plate electrically connected to an outside surface of the protective circuit board, a second plate electrically connected to the bare cell, and an inside bending part connected between the first plate and the second plate. The first plate of the lead plate is bent around the inside bending part at 180 degrees such that the bare cell is coupled with the protective circuit board in parallel. Therefore, the distance between the bare cell and the protective circuit is reduced, and the capacity per volume of the rechargeable battery is increased.

27 Claims, 11 Drawing Sheets

(56) References Cited

U.S. PATENT DOCUMENTS

| | | |
|---|---|---|
| 2005/0208346 A1* | 9/2005 | Moon et al. ............... 429/7 |
| 2005/0266279 A1 | 12/2005 | Kim |
| 2008/0061735 A1 | 3/2008 | Toya et al. |
| 2009/0085518 A1* | 4/2009 | Hong et al. ............... 320/134 |

FOREIGN PATENT DOCUMENTS

| | | |
|---|---|---|
| KR | 10-2006-0037841 | 5/2006 |
| KR | 1020060037841 A | 5/2006 |
| KR | 10-2006-0118298 | 11/2006 |
| KR | 10-2006-0118299 | 11/2006 |
| KR | 1020060118298 A | 11/2006 |
| KR | 1020060118299 A | 11/2006 |
| WO | WO03/069696 | 8/2003 |
| WO | 2005/074055 A1 | 8/2005 |
| WO | 2005/078825 A1 | 8/2005 |
| WO | WO2005/074055 | 8/2005 |
| WO | WO2005/078825 | 8/2005 |

\* cited by examiner

RECHARGEABLE BATTERY WITH PROTECTIVE CIRCUIT BOARD LEAD PLATES CONNECTION

CROSS-REFERENCE TO RELATED APPLICATIONS AND CLAIM OF PRIORITY

This application is a continuation-in-part application of the prior application Ser. No. 12/007,363 filed in the U.S. Patent & Trademark Office on 9 Jan. 2008 now U.S. Pat. No. 7,811,686 and assigned to the assignee of the present invention. Furthermore, this application makes reference to, incorporates the same herein, and claims all benefits accruing under 35 U.S.C. §119 from an application for RECHARGEABLE BATTERY earlier filed in the Korean Intellectual Property Office on 17 Jan. 2007 and there duly assigned Serial No. 10-2007-0005431, and makes reference to, incorporates the same herein, and claims all benefits accruing under 35 U.S.C. §120 from an application for RECHARGEABLE BATTERY earlier filed in the U.S. Patent & Trademark Office on 9 Jan. 2008 and there duly assigned Ser. No. 12/007,363, and makes reference to, incorporates the same herein, and claims all benefits accruing under 35 U.S.C. §119 from an application for RECHARGEABLE BATTERY earlier filed in the U.S. Patent & Trademark Office on 23 Mar. 2009 and there duly assigned Ser. No. 12/382,744.

BACKGROUND OF THE INVENTION

1. Field of the Invention

The present invention relates to a rechargeable battery, and more particularly, to a rechargeable battery that can simplify a manufacturing process and improve the capacity of the battery, in comparison with a conventional rechargeable battery.

2. Description of the Related Art

Generally, a rechargeable battery can be used repeatedly if the rechargeable battery is charged, unlike a disposable battery. The rechargeable battery has been used mainly as a power source for electronic devices used for communication, for information processing, and for multimedia. Since a rechargeable battery is a power source having ultra-light weight, high energy density, high output voltage, low self-electric discharge rate, environmental friendly properties and long lifetime, interest in rechargeable batteries has been recently become intensified and rapidly developed.

The rechargeable battery can be classified into either a Nickel-Metal Hydride (Ni-MH) battery or a Lithium-ion (Li-ion) battery, depending upon th electrode active material. Particularly, the Lithium-ion battery can be classified into one of two categories according to the type of electrolyte: one category of Lithium-ion battery uses a liquid electrolyte and the other category uses a solid polymer electrolyte or a gel state electrolyte. Further, the Lithium-ion battery can be classified into various types such as a can type or a pouch type according to the shape of a container receiving the electrode assembly.

The Lithium-ion battery is much higher in energy density per weight than the disposable battery so as to realize its characteristic as an ultra-light battery. The average voltage per cell of the Lithium-ion battery is 3.6V, which is equal to three times of the average voltage of any other rechargeable battery, such as Nickel-Cadmium battery and Nickel-Metal Hydride (Ni-MH) battery. In addition, the Lithium-ion battery has a self electric discharge rate of less than about 5% per a month at 20° C., which is about ⅓ of the rate of a Ni—Cd battery or a Ni-MH battery. Moreover, the Lithium-ion battery is environmental friendly because Lithium-ion batteries do not use a heavy metal such as Cadmium or Mercury, and further because a Lithium ion battery has the ability to charge and discharge for approximately 1,000 times in steady state. Therefore, the Lithium-ion battery has rapidly developed with concomitantly with recent progress in information and communication technology.

The Lithium-ion battery is formed by disposing an electrode assembly which is composed of an anode plate, cathode plate and separator and which is laminated and wound, inside a can made from aluminum or aluminum alloy, filled with an electrolytic solution, and tightly sealed along the upper opening of the can by a cap assembly.

The reason for forming the can from aluminum or aluminum alloy is that the weight of the aluminum is lighter than iron or any of the other electrically conductive metals and therefore it is possible to make the battery lightweight, and the aluminum would not corrode even when the battery has been used for a long time. Such a Lithium-ion battery usually has the electrode terminal which is electrically isolated from the can and the electrode terminal becomes one pole of the battery. Meanwhile, the can which encases the battery becomes the other pole.

Meanwhile, the Lithium-ion battery may be exposed to a danger of explosion by a sudden increase in the voltage in the cases of an external short-circuit, an internal short-circuit by a mechanical impact, or an over-charge/over-discharge. To avoid such a danger, the Lithium ion battery is normally disposed inside a battery pack which is electrically connected to a safety device such as a positive temperature coefficient (PTC) element, a thermal fuse and a protection circuit module. Meanwhile, the safety device is coupled to either an anode electrode or a cathode electrode of a bare cell using a conductor, which is so-called a lead plate. The bare cell is a battery in a state where a cap assembly is coupled with a can into which an electrode assembly is inserted. In other words, the bare cell shows the state of the rechargeable battery before the rechargeable battery is formed as either a cylindrical type battery pack, or an angular type battery pack, or a pouch type battery pack. The safety device creates an electrical open circuit that interrupts the flow of an electric current when the battery temperature reaches a high level or when the battery voltage suddenly increases by an over-charge, or when an over-discharge of the battery occurs, so as to prevent the battery from being broken.

The battery pack can be classified into two types: either a hard pack battery or an inner pack battery, according to the external shape of the battery pack. In the hard pack battery, a plastic resin housing is integrally molded on the outside the battery in a state where the external terminal that is to be electrically connected to an external device is exposed. In an inner pack battery, a plastic resin housing is not molded on the outside the battery in a state where an external terminal is exposed. Generally, when a hard pack battery is mounted on an external device, because a part of outer surface of the housing of the hard pack battery is exposed, at least one part of the outer surface of the housing of the hard pack battery which is exposed is composed of the same material as the housing of the external device. Therefore, the hard pack battery may be mounted easily on the external device. The housing of the battery has a problem, however, because the housing must be produced to have a structure that is suitable for the shape and the structure of the external device. On the other hand, for the inner pack battery, because an extra decoration is attached to the case when the inner pack battery is mounted on the external device, the loading process of the inner pack battery is troublesome in comparison to the hard pack battery.

But, the inner pack battery advantageously may be used regardless of the shape or structure of the external device. Therefore, the development of the inner pack battery, which can be employed regardless of the shape and a structure of external device, has recently been emphasized.

The bare cell is usually constructed with an anode terminal and a cathode terminal on a side opposite to a protective circuit board. The anode terminal is a cap plate made from aluminum or aluminum alloy, and the cathode terminal is a terminal extended from the cap plate like a protrusion and electrically isolated from the cap plate by an insulating gasket disposed around the circumference of the cathode terminal.

The protective circuit board is constructed with a circuit formed on a panel made from resin, and an external terminal is positioned on an outside surface. The circuit borne by the circuit board is formed on a back side of the protective circuit board, i.e., on the inside surface of the protective circuit board. In addition, the lead plate is located between the bare cell and the protective circuit board so as to be electrically connected between the bare cell and the protective circuit board. That is, the cap plate of the bare cell and the protective circuit board are electrically connected by an anode lead plate, and the electrode terminal of the bare cell and the protective circuit board are electrically connected by a cathode lead plate. In addition, the protective circuit board is attached to the bare cell by melting of a molding resin after the protective circuit board has been electrically connected to the bare cell.

The lead plate is generally formed in an 'L'-shape. One surface of the lead plate is attached to the bare cell and the other surface is attached to the protective circuit board. Accordingly, the distance between the bare cell and the protective circuit board is equal to the length of the lead plate itself. Accordingly, the longitudinal size of the battery is increased, reducing the capacity per volume of the battery.

In addition, the protective circuit board and other accessories of the battery are made from a molding resin, whereas the cap plate and the can of the bare cell are made from a metal like material. When forming the battery by connecting the protective circuit board attached to the bare cell, the contact area between the molding resin part and the bare cell is not large. Therefore, the battery may be easily twisted or bent by an external force.

That is, if the molding resin part is twisted about the bare cell beyond a certain angle, the electrical connection between the anode terminal or the cathode terminal of the bare cell and the external terminal of the protective circuit board through the lead plate may be unstable, even when the molding resin part is not completely broken. In addition, the safety devices of the battery may not to operate normally.

In addition, the method of combining the molding resin part by the melting method is problematical because the manufacturing process is complicated and the cost is high. Therefore, the productivity becomes low.

SUMMARY OF THE INVENTION

It is therefore an object of the present invention to provide an improved rechargeable battery.

It is another object of the present invention to provide an improved rechargeable battery having increase capacity per volume.

It is still another object of the present invention to simplify the manufacturing process of the rechargeable battery.

It is a further object of the present invention to provide an improved rechargeable battery having enhanced insulation between the cap plate and the protective circuit board.

According to one aspect of the present invention, a rechargeable battery may be constructed with a bare cell, a protective circuit board electrically connected to the bare cell, a lead plate disposed between the bare cell and the protective circuit board, and a combining case covering an upper end of the bare cell, the protective circuit board and the lead plate. The protective circuit board may be constructed with a first plate electrically connected to the protective circuit board, a second plate electrically connected to the bare cell, and an inside bending part connected between the first plate and the second plate. The first plate is bent around the inside bending part at 180 degrees such that the bare cell is coupled with the protective circuit board in parallel.

The lead plate is constructed with a first plate electrically connected to an outside surface of the protective circuit board, a second plate electrically connected to the bare cell, and an inside bending part connected between the first plate and the second plate. The cathode lead plate may be alternatively positioned to have inner surfaces of spaced-apart flanges of upper and lower plates engaging opposite sides of a protective circuit board, or positioned to have outer surfaces of spaced-apart flanges of upper and lower plates interposed between a lower side of a protective circuit board and electrode terminal, while an inner surface of upper plate of anode lead plate operational engages an electrical lead borne by the outer, or upper, surface of protective circuit board and the outer, or lower, surface of the lower plate of the anode lead plate electrically contacts the cap plate. During assembly, the first plate of the lead plate is bent around the inside bending part at about 180 degrees such that the bare cell is coupled with the protective circuit board, and are firmly held in geometric parallel. The distance between the bare cell and the protective circuit is reduced, and the capacity per volume of the rechargeable battery is increased.

The lead plate may be formed in a rectangular shape having an opening at one side of the rectangle.

The combining case may be constructed with a plurality of attaching means for securely attaching the protective circuit board to the inside of the combining case.

The attaching means may include a tapered part formed at a front end of the combining case that is close to the bare cell for guiding the protective circuit board during an inserting of the protective circuit board into the combining case, and an attaching groove for securely attaching the protective circuit board formed at a rear end of the combining case that is far from the bare cell compared to the tapered part.

The protective circuit board may be constructed with a plurality of attaching jaws at the position corresponding to the attaching groove. The attaching jaws are inserted in and securely attached to the attaching groove.

The rechargeable battery may be further constructed with at least one insulation filling member disposed between the bare cell and the protective circuit board for insulating the bare cell and the protective circuit board and preventing deformation of the bare cell and the protective circuit board.

The insulation filling member may be placed on the cap plate of the bare cell.

The insulation filling member may be made from an insulation tape.

The rechargeable battery may be further constructed with a stopper mounted on the cap plate of the bare cell in order to prevent the protective circuit board from being pressurized by the combining case.

The stopper may be constructed with a groove in the inside of the stopper, and the cap plate may be constructed with a supporting member. Therefore, the supporting member of the cap plate may be inserted and securely attached into the groove inside the stopper.

The combining case may be constructed with a groove at the position that corresponds to the stopper. Therefore, the stopper may be inserted and securely attached into the groove of the combining case.

The combining case may be constructed with a sleeve surface at the lower part of the combining case. The combining case may be connected to the upper end of the bare cell in a sleeve method by using the sleeve surface.

The rechargeable battery may be further constructed with a safety device whose one side is electrically connected to the bare cell and the other is electrically connected to the lead plate.

The safety device may be made from a positive temperature coefficient (PTC) element.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
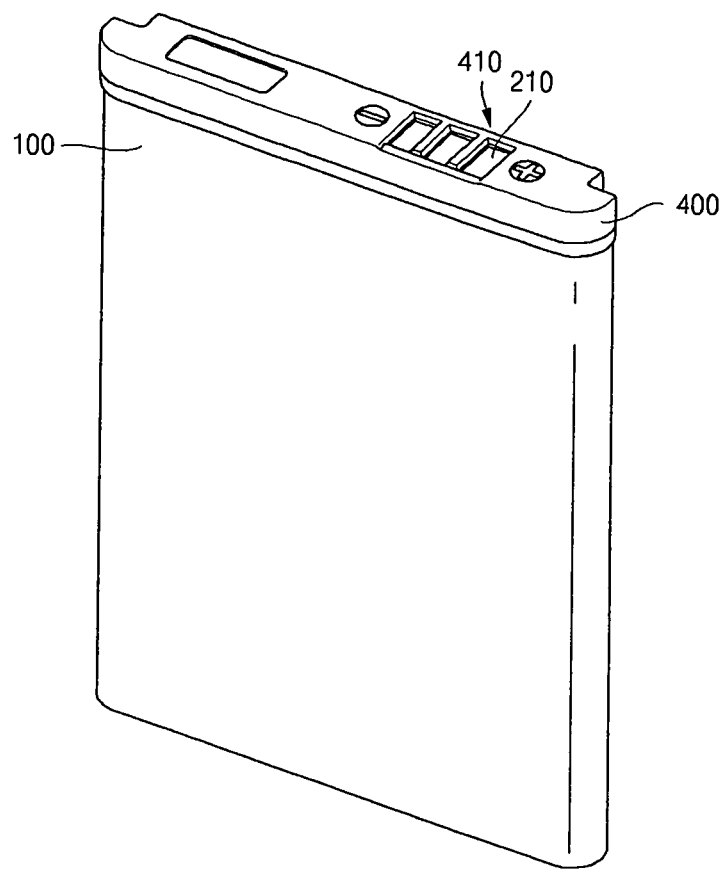
FIG. 1 is an oblique view illustrating a rechargeable battery constructed as one embodiment according to the principles of the present invention.

Hereinafter, preferred embodiments of the present invention will be described in detail with reference to the accompanying drawing. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Here, when one element is referred to as being connected to another element, one element may be not only directly connected to the another element but instead may be indirectly connected to the another element via one or more other elements. Also, when an element is referred to as being "on" another element, it can be directly on the another element or be indirectly on the another element with one or more intervening elements interposed therebetween. Further, some of the elements that are not essential to the complete description of the invention have been omitted for clarity. In addition, like reference numerals refer to like elements throughout.

Referring to FIGS. 1 and 2, a rechargeable battery is constructed with a bare cell 100, a protective circuit board 200 electrically connected to bare cell 100, a lead plate 300 for electrically connecting bare cell 100 to protective circuit board 200, and a combining case 400 for covering the upper end of bare cell 100, protective circuit board 200 and lead plate 300.

Figure 7:
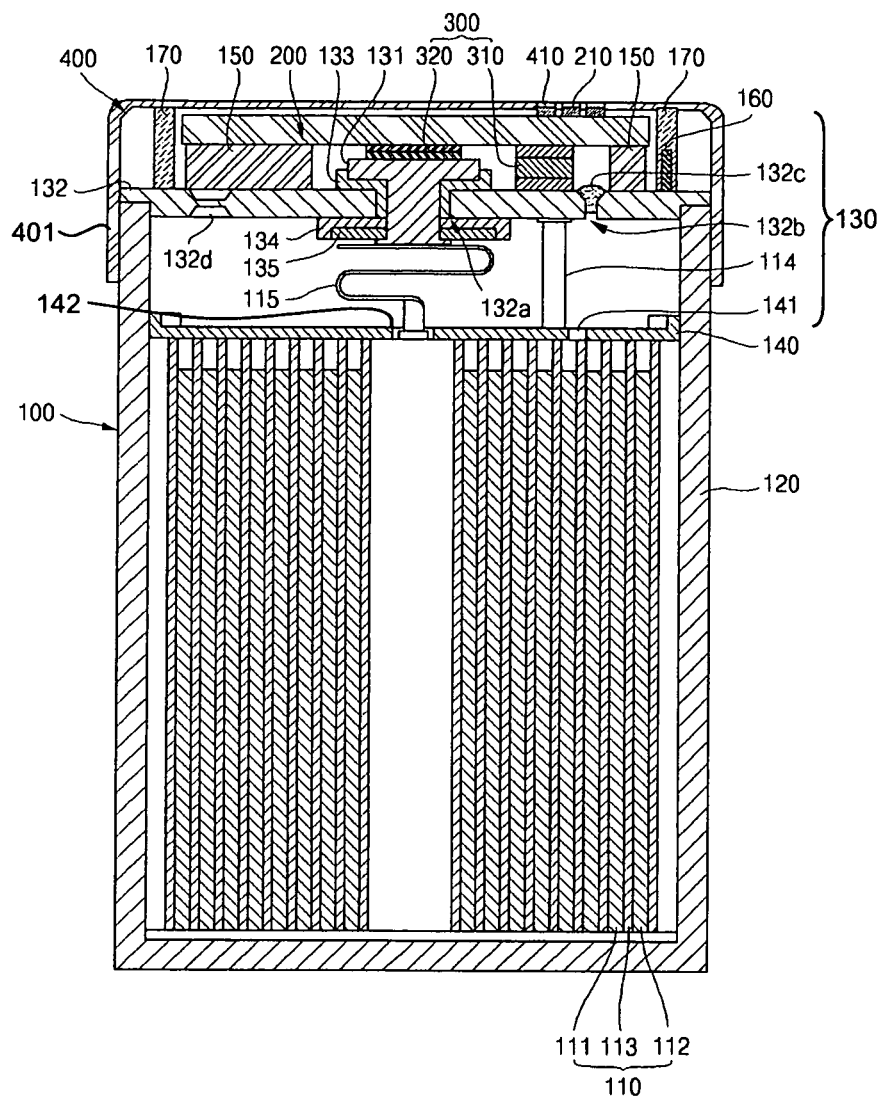
FIG. 7 is a cross sectional view illustrating a rechargeable battery constructed as one embodiment according to the principles of the present invention.

Referring to FIG. 7, bare cell 100 is constructed with an electrode assembly 110, a can 120 for receiving electrode assembly 110 and a cap assembly 130 for sealing an upper opening of can 120.

Electrode assembly 110 is formed by laminating and winding an anode plate 111 coated with anode active material, a cathode plate 112 coated with cathode active material and a separator 113 interposed between anode plate 111 and cathode plate 112.

Anode plate 111 is constructed with an anode tab 114 electrically connected to a region of an anode collector that is not coated with the anode active material; and cathode plate 112 is constructed with a cathode tab 115 electrically connected to a region of a cathode collector that is not coated with the cathode active material. Meanwhile, insulation tapes (not shown) for preventing a short circuit between each of the two tabs 114 and 115 and the two electrode plates 111 and 112 may be respectively winded around border regions where anode tab 114 and cathode tab 115 are drawn out from electrode assembly 110. In addition, the width of separator 113 may be wider than anode plate 111 and cathode plate 112 so as to prevent a short circuit between electrode plates 111 and 112.

On the other hand, an insulation case 140 may be formed on an upper surface of electrode assembly 110 to electrically insulate electrode assembly 110 and cap assembly 130, and to cover an upper end of electrode assembly 110. Insulation case 140 is made from polymer resin having an insulation property. In addition, a hole 142 is formed in central part of insulation case 140 so that cathode tab 115 can pass through. An electrolytic solution through-hole 141 is formed on one side of insulation case 140.

Can 120 is made from aluminum or aluminum alloy, and is roughly formed in a rectangular shape and receives electrode assembly 110 through the upper end opening of can 120 to function as a container for electrode assembly 110 and an electrolytic solution (not shown). In addition, can 120 can function as a terminal.

Cap assembly 130 is constructed with a flat type cap plate 132 having a size and a shape that is similar to the upper end opening of can 120. Meanwhile, a terminal hole 132*a* is formed in a central part of cap plate 132 and a tube-shaped gasket 133 is formed between electrode terminal 131 passing through terminal hole 132*a* and cap plate 132 for electrical insulating electrode terminal 131 passing and cap plate 132. In addition, an insulation plate 134 is disposed on the lower surface of cap plate 132 and a terminal plate 135 is placed on the lower surface of insulation plate 134. Further, a bottom part of electrode terminal 131 is electrically coupled to terminal plate 135. Anode tab 114 drawn out from anode plate 111 is welded to the lower surface of cap plate 132 and cathode tab 115 drawn out from cathode plate 112 is welded to the lower surface of electrode terminal 131. Cathode tab 115 is constructed with a bent part having a zigzag-figure.

An electrolytic solution injection hole 132*b* is formed in one side of cap plate 132 and a sealing cap 132*c* is disposed to seal electrolytic solution injection hole 132*b* after the injection of the electrolytic solution. Sealing cap 132*c* is a ball-member made from aluminum or aluminum-containing metal. Sealing cap 132*c* is disposed in electrolytic solution injection hole 132*b* and is mechanically pressed in electrolytic solution injection hole 132*b*. In addition, sealing cap 132*c* is welded to cap plate 132 along the circumference of electrolytic solution injection hole 132*b*. On the other hand, a safety vent 132*d* is formed on the other side of cap plate 132. Safety vent 132*d* may be broken to prevent an ignition or an explosion of the battery when the internal pressure of the battery rises over a predetermined level.

Figure 4:
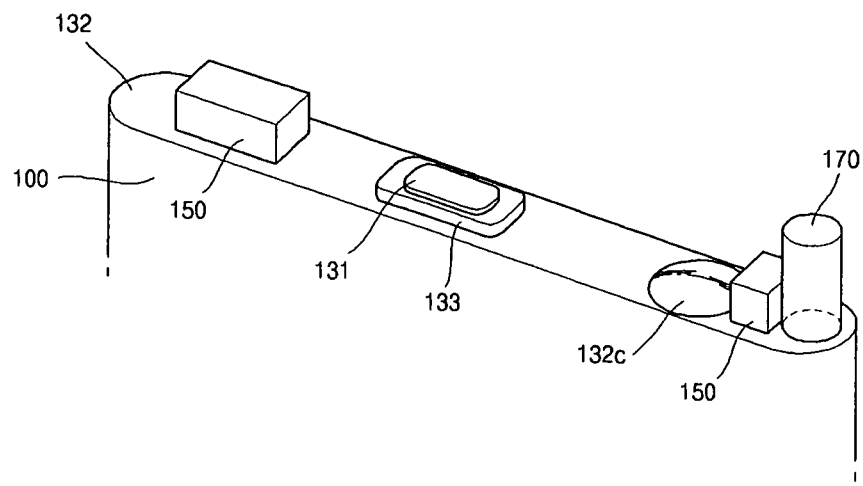
FIG. 4 is a partial oblique view illustrating a rechargeable battery constructed with an insulation filling member and a stopper, according to one embodiment of the principles of the present invention.

Referring to FIGS. 4 and 7, an insulation filling member 150 may be placed on at least a part of the space between bare cell 100 and protective circuit board 200.

Insulation filling member 150 fills the space between bare cell 100 and protective circuit board 200 and prevents protective circuit board 200 from being moved or deformed due to a bending phenomenon caused by an external force. Further, insulation filling member 150 improves the insulation between bare cell 100 and protective circuit board 200.

Insulation filling member 150 may be disposed on cap plate 132, and may be made from an insulation tape. Meanwhile, the insulation tape may be made from a polyethylene (PE) sheet.

In addition, a stopper 170 is mounted on cap plate 132 in order to prevent protective circuit board 200 from being deformed by the pressure of combining case 400 when cap plate 132 is covered with combining case 400. Meanwhile, stopper 170 may be formed integrally with cap plate 132 or may be coupled to cap plate 132.

In the method for connecting stopper 170 to cap plate 132, a supporting member 160 is coupled to cap plate 132, and a groove may be formed inside stopper 170 so that supporting member 160 is inserted into stopper 170 and securely attached to stopper 170.

Protective circuit board 200 is formed in a shape of a plate having the same or similar size and shape as cap plate 132 which is facing bare cell 100. Protective circuit board 200 is constructed with a protective circuit for preventing over-charge or over-discharge of the battery to insure safety of the battery. Meanwhile, the protective circuit and each of external terminals 210 are electrically connected by an electrically conductive element passing through protective circuit board 200.

Figure 8:
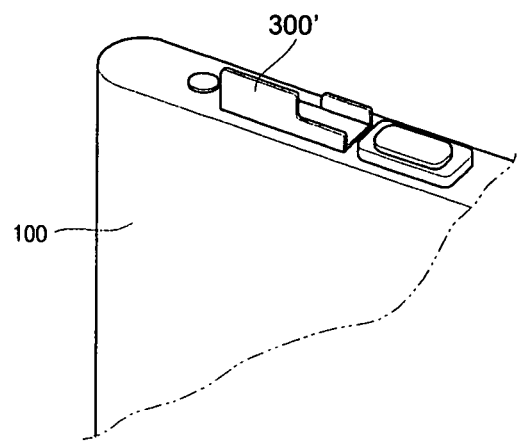
FIG. 8 is an enlarged partial oblique view of the rechargeable battery constructed with a contemporary lead plate.

Referring to FIG. 8, the contemporary lead plate 300' is generally formed in a 'L'-shape. One surface of lead plate 300' is securely attached to bare cell 100 and the other surface of lead plate 300' is attached to the protective circuit board (not shown). Accordingly, the distance between the bare cell and the protective circuit board is equal to a length of the lead plate. Accordingly, the longitudinal size of the battery increases, reducing the capacity per volume of the battery.

Figure 2A:
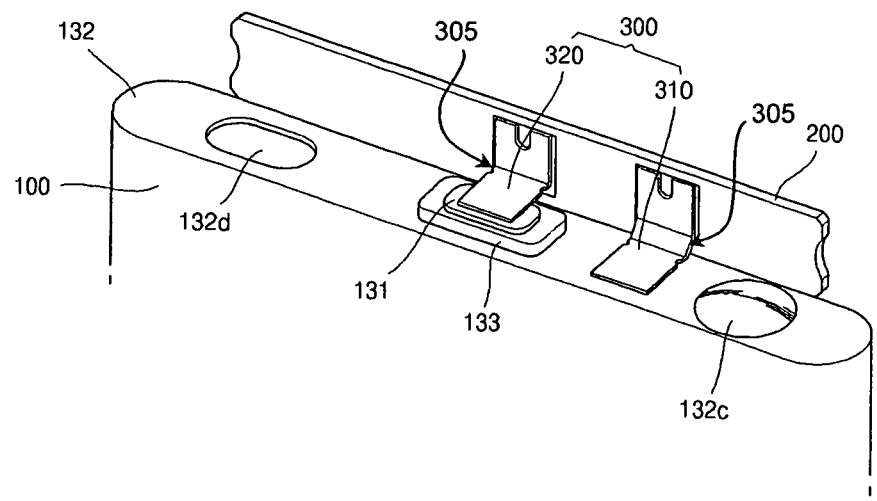
FIGS. 2a and 2b are oblique views illustrating a bare cell before and after a parallel coupling of a protective circuit board using a lead plate, according to one embodiment of the principles of the present invention.
Figure 2B:
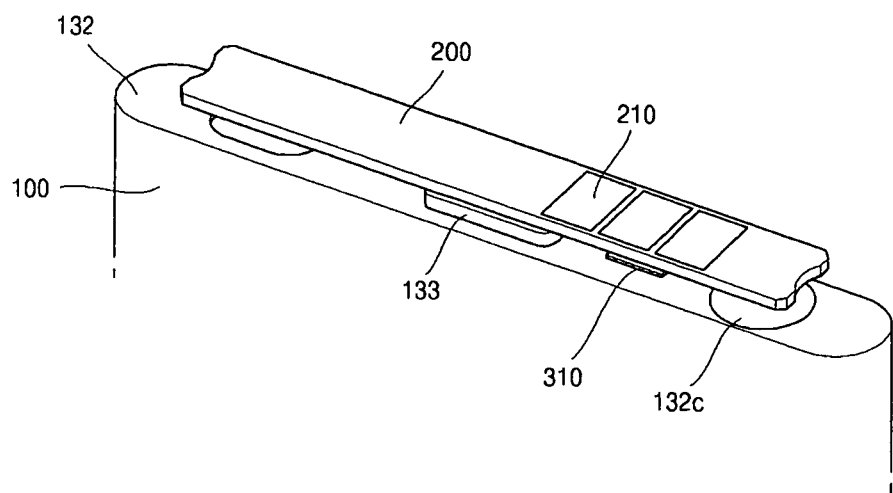
Figure 3A:
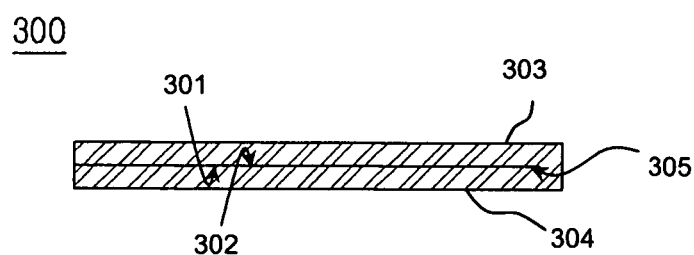
FIG. 3a is a side view illustrating a lead plate constructed as one embodiment according to the principles of the present invention.
Figure 3B:
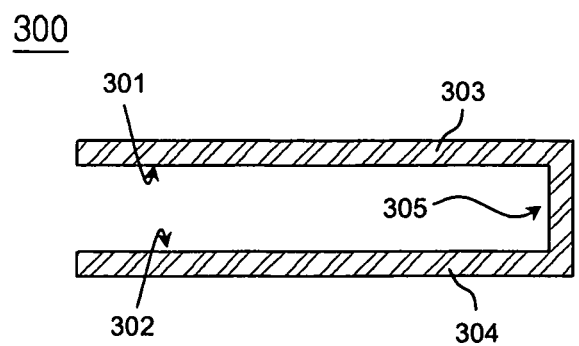
FIG. 3b is a side view illustrating a lead plate constructed as another embodiment according to the principles of the present invention.

According to the principles of the present invention, as shown in FIGS. 3*a* and 3*b*, one plate 304 of lead plate 300 is electrically connected to electrode terminal 131 of bare cell 100 or cap plate 132, and the other plate 303 of lead plate 300 is electrically connected to protective circuit board 200. Plate 303 and plate 304 are connected by an inside bending part 305. Lead plate 300 is bent around inside bending part 305 such that bare cell 100 is coupled with protective circuit board 200 in parallel, as shown in FIG. 2*a* and FIG. 2*b*.

FIGS. 3*a* and 3*b* illustrate lead plate 300 constructed as different embodiments according to the principles of the present invention. Referring to FIG. 3*a*, inner surface 301 of plate 303 of lead plate 300 electrically connected with electrode terminal 131 of bare cell 100 or cap plate 132 may be contacted with inner surface 302 of plate 304 of lead plate 300 electrically connected with protective circuit board 200. Alternatively, as shown in FIG. 3*b*, lead plate 300 may be formed in a '⊏' shape, i.e., a rectangular shape with an opening at one side of the rectangle. That is, in lead plate 300 as shown in FIG. 3*b*, inner surface 301 of plate 303 does not contact inner surface 302 of plate 304. Accordingly, the distance between bare cell 100 and protective circuit board 200 formed by the prior 'L' shape lead plate 300' as shown in FIG. 8 is significantly reduced and a capacity per volume of the battery is improved.

Lead plate 300 include an anode lead plate 310 and a cathode lead plate 320 as shown in FIG. 7.

Anode lead plate 310 is electrically connected to protective circuit board 200 at one side of inside bending part 305 and is electrically connected to cap plate 132 of bare cell 100 at the other side.

Figure 9:
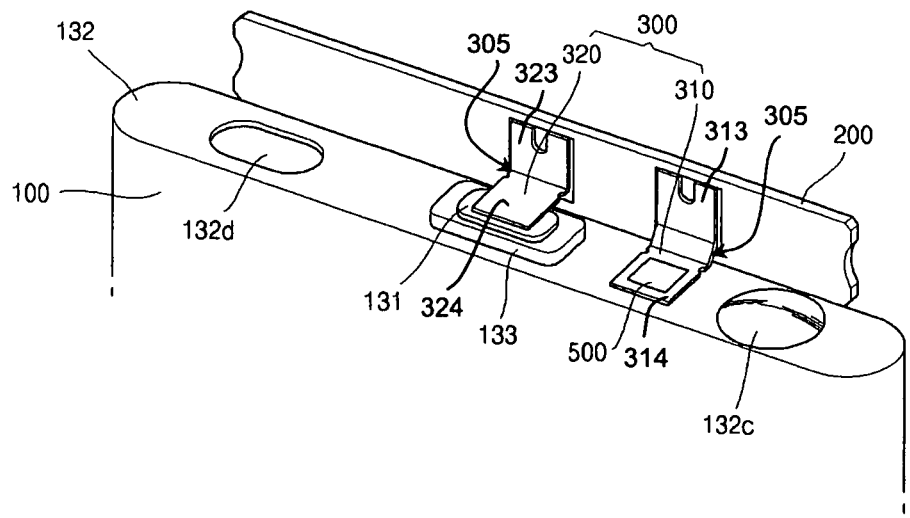
FIG. 9 is an assembly view detail illustrating a bare cell constructed with a safety device according to another embodiment of the principles of the present invention.

Further, referring to FIG. 9, cathode lead plate 320 has one plate 323 electrically connected to protective circuit board 200 and other plate 324 electrically connected to electrode terminal 131 of bare cell 100. Meanwhile, anode lead plate 310 has one plate 313 electrically connected to protective circuit board 200 and other plate 314 electrically connected to safety device 500.

Safety device 500 is installed to safely protect the battery from over-current, over-charge, and over-discharge of the rechargeable battery. Safety device 500 has one side connected to cap plate 132 of bare cell 100 and the other side connected to anode lead plate 310 by its own connecting terminal. A fuse, or a bimetal, or a positive temperature coefficient (PTC) element, may be installed as safety device 500. Safety device 500 in the present embodiment may be the PTC component that quickly disconnects the flow of the electric current when the temperature rises over a certain range and quickly connects the flow of the electric current when the temperature of bare cell 100 drops below a certain range.

Combining case 400 is constructed with an injection molded case that has a space formed inside so as to cover protective circuit board 200 when connected to bare cell 100. Combining case 400 has a sleeve surface 401 at the inside lower part of combining case. When combining case 400 is connected to bare cell 100, sleeve surface 401 is connected to bare cell 100 in a sleeve method surrounding the upper end circumference of bare cell 100. The sleeve method installs sleeve surface 401 of combining case 400 to surround the circumference of the upper end surface of bare cell 100. Accordingly, the upper end of bare cell 100 is overlapped by bare cell 100 and combining case 400, thereby improving safety.

On the other hand, combining case 400 can be prevented from being easily separated from the upper end of bare cell 100 by enhancing the adhesive force between combining case 400 and bare cell 100. Particularly, it is possible to enhance the adhesive force between combining case 400 and bare cell 100 by bonding sleeve surface 401 of combining case 400 and bare cell 100, or taping the combined circumferential outer surface of the rechargeable battery after combining case 400 and bare cell 100 are combined.

An external terminal hole 410 is formed on one surface of combining case 400 so that external terminal 210 of protective circuit board 200 is exposed through combining case 400 and may be connected to an external device (not shown). External terminal hole 410 is formed on the corresponding surface of combining case 400, particularly on the upper surface of combining case 400 in a size and shape that is similar to external terminal 210.

Figure 5A:
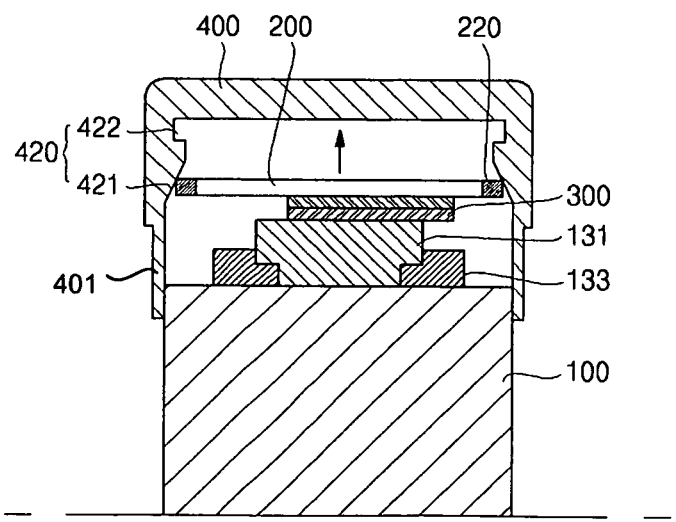
FIGS. 5a and 5b are side sectional views illustrating a rechargeable battery before and after the coupling of a protective circuit board and a combining case, according to one embodiment of the principles of the present invention.
Figure 5B:
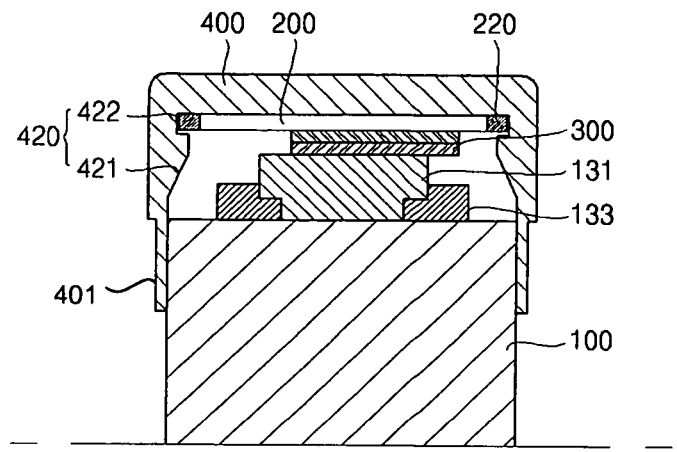

On the other hand, as shown in FIGS. 5a and 5b, a plurality of attaching units 420 of protective circuit board 200 are formed inside combining case 400 to prevent protective circuit board 200 from being broken or damaged, or welded parts of protective circuit board 200 from being weaken due to a movement caused by an external force. Meanwhile, attaching units 420 may be formed as a lock structure such that protective circuit board 200 can be relatively easily and securely attached to combining case 400, but protective circuit board 200 and combining case 400 can not be easily separated.

In other words, attaching units 420 include a tapered part 421 formed at the front end of combining case 400 for guiding protective circuit board 200 and an attaching groove 422 for receiving protective circuit board 200 at the rear end of combining case 400, in the direction of an insertion of protective circuit board 200 when combining case 400 is sleeve-connected to bare cell 100 as shown in FIGS. 5a and 5b.

Figure 6:
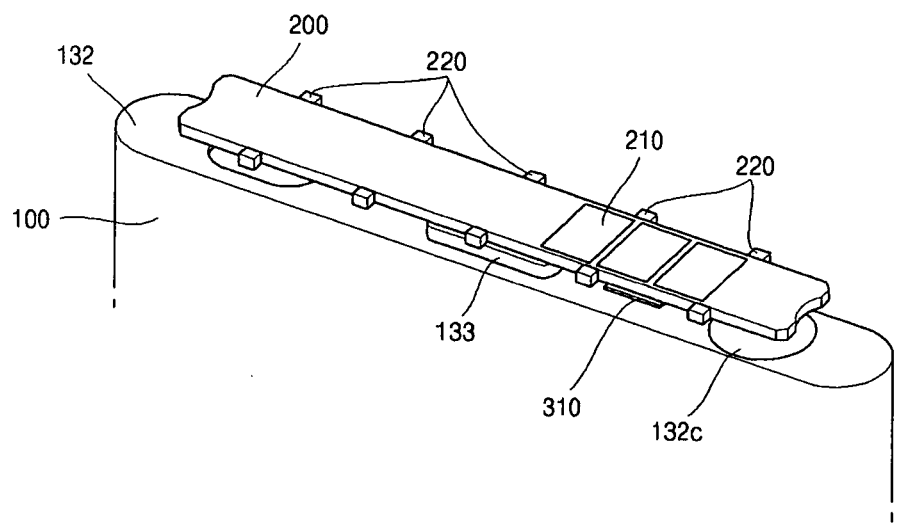
FIG. 6 is a partial oblique view illustrating a rechargeable battery and a protective circuit board constructed with a plurality of attaching jaw, according to one embodiment of the principles of the present invention.

Further, as shown in FIG. 5a to FIG. 6, protective circuit board 200 is constructed with a plurality of attaching jaws 220 that are inserted in and securely attached to attaching groove 422 of attaching units 420, at the positions that correspond to attaching groove 422 of combining case 400.

That is, attaching unit 420 is formed so that attaching jaw 220 of protective circuit board 200 is inserted in attaching groove 422 and is not easily separated from attaching groove 422 when combining case 400 is connected to the upper end of bare cell 100. Accordingly, the movement of protective circuit board 200 by an external force is prevented.

Furthermore, combining case 400 may include a groove (not shown) formed at the position that corresponds to stopper 170 mounted in cap plate 132. Stopper 170 may be inserted in and securely attached to the groove as shown in FIG. 7. Accordingly, the adhesive force between combining case 400 and bare cell 100 is enhanced, thereby preventing combining case 400 from being easily separated from bare cell 100.

Hereinafter, the operation of the rechargeable battery according to the embodiment of the invention will be explained.

As shown in FIG. 2a and FIG. 2b, lead plate 300 connected to protective circuit board 200 is electrically coupled to bare cell 100 manufactured by a series of processes. In detail, anode lead plate 310 is electrically connected to safety device 500 coupled to cap plate 132 and cathode lead plate 320 is electrically connected to electrode terminal 131 of bare cell 100.

Subsequently, one plate of lead plate 300 is bent around inside bending part 305 of lead plate 300 at 180 degrees so that protective circuit board 200 is in parallel with cap plate 132 of bare cell 100. Meanwhile, lead plate 300 may be formed so that inner surfaces 301 and 302 face each other as shown in FIG. 3a. Alternatively, as shown in FIG. 3b, lead plate 300 may be formed in '⊏' shape.

As described above, by bending lead plate 300 at 180 degrees, the distance between protective circuit board 200 and cap plate 132 is reduced. Accordingly, the longitudinal size of the battery is significantly reduced and the capacity per volume of the battery is increased.

Following, as shown in FIGS. 5a and 5b, combining case 400 is sleeve-connected to bare cell 100 electrically connected to protective circuit board 200. By using combining case 400 as a separate injection molded case, instead of forming the molded resin part by melting method of a molded resin in the prior art, the manufacturing process is simplified and the cost is reduced when the battery is manufactured, and therefore the productivity is improved.

On the other hand, in the combining process, protective circuit board 200 is inserted inside combining case 400 and is securely attached by attaching unit 420 formed in the inside of combining case 400. Specifically, the movement of protective circuit board 200 is guided by tapered part 421 of attaching unit 420, and a plurality of attaching jaws 220 are inserted in and securely attached to attaching groove 422 formed at the rear end of tapered part 421. Accordingly, protective circuit board 200 is securely attached inside combining case 400, thereby preventing the movement and the deformation of protective circuit board 200 caused by an external force.

On the other hand, referring to FIG. 7, insulation filling member 150 is included on cap plate 132 of bare cell 100. Insulation filling member 150 is located in at least a part of the space between cap plate 132 and protective circuit board 200. Cap plate 132 and protective circuit board 200 are close to each other when coupled together in parallel by bending lead plate 300 at 180 degrees. Accordingly, the insulation property between cap plate 132 and protective circuit board 200 is improved.

Furthermore, stopper 170 is mounted in cap plate 132 in order to prevent protective circuit board 200 from being pressurized and deformed by combining case 400 during the combining process of combining case 400. Meanwhile, combining case 400 is constructed with a groove at the position that corresponds to stopper 170. Stopper 170 is correspondingly combined with the groove to enhance the adhesive force between bare cell 100 and combining case 400.

Figure 9A:
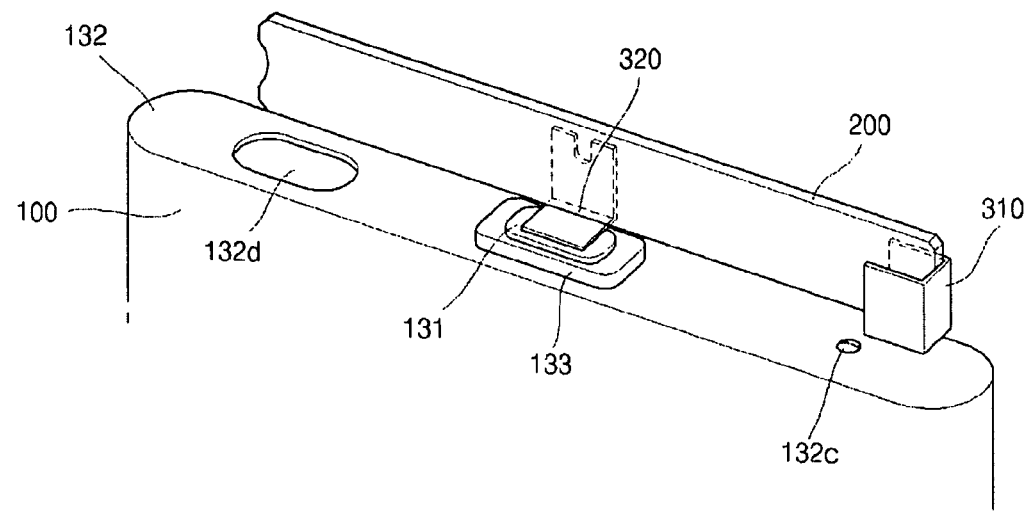
FIG. 9a is an assembly view detail illustrating a bare cell constructed according to another still embodiment of the principles of the present invention.
Figure 9B:
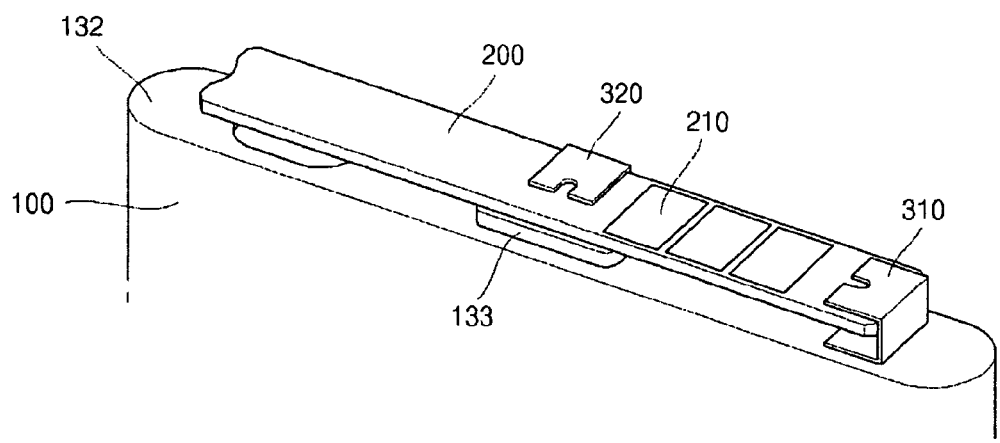
FIG. 9b is a partial oblique view illustrating a bare cell constructed according to another embodiment of the principles of the present invention.
Figure 11A:
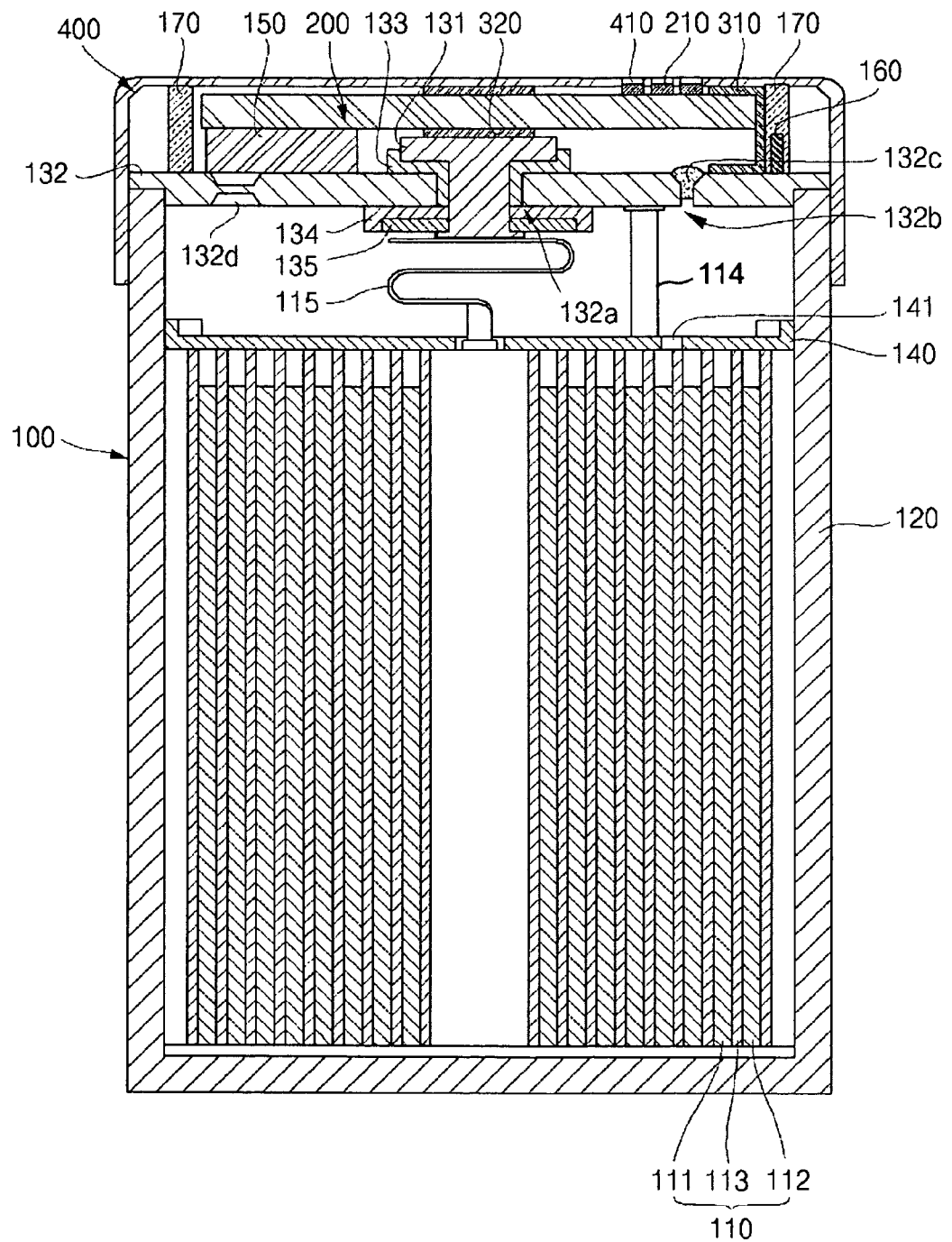
FIG. 11a is a cross-sectional elevation view illustrating a bare cell constructed according to another embodiment of the principles of the present invention.

FIG. 9a, an assembly view detail, FIG. 9b, a partial oblique view, and FIG. 11a, a cross-sectional elevation view, illustrate a bare cell constructed according to still another embodiment of the principles of the present invention that incorporate alternative aspects and features into the fabrication of a rechargeable battery constructed with a bare cell 100, a protective circuit board 200 electrically connected to bare cell 100, and lead plates 310, 320 for electrically connecting bare cell 100 to protective circuit board 200. Combining case 400 covers the upper end of bare cell 100, protective circuit board 200 and lead plates 310, 320.

A cap assembly is constructed with a flat type cap plate 132 having a size and a shape that is similar to the upper end opening of can 120. Electrolytic solution injection hole 132b is formed in one side of cap plate 132 and a sealing cap 132c is disposed to seal electrolytic solution injection hole 132b after the injection of the electrolytic solution. Sealing cap 132c may be a ball-member made from aluminum or aluminum-containing metal. Sealing cap 132c is disposed in electrolytic solution injection hole 132b and is mechanically pressed in electrolytic solution injection hole 132b. In addition, sealing cap 132c may be welded to cap plate 132 along the circumference of electrolytic solution injection hole 132b. Safety vent 132d is formed on the other side of cap plate 132. Safety vent 132d is configured to be broken to prevent an ignition or an explosion of the battery when the internal pressure of the battery rises over a predetermined level.

An insulation filling member 150 may be placed on at least a part of the space between bare cell 100 and protective circuit board 200. Insulation filling member 150 fills the space between bare cell 100 and protective circuit board 200 and prevents protective circuit board 200 from being moved or deformed due to a bending phenomenon caused by an external force. Further, insulation filling member 150 improves the insulation between bare cell 100 and protective circuit board 200.

Insulation filling member 150 may be disposed on cap plate 132, and may be made from an insulation tape; that insulation tape may be made from a polyethylene (PE) sheet.

A stopper 170 is mounted on cap plate 132 in order to prevent protective circuit board 200 from being deformed by the pressure of combining case 400 when cap plate 132 is covered with combining case 400. Meanwhile, stopper 170 may be formed integrally with cap plate 132 or may be coupled to cap plate 132.

In the method for connecting stopper 170 to cap plate 132, a supporting member 160 is coupled to cap plate 132, and a groove may be formed inside stopper 170 so that supporting member 160 is inserted into stopper 170 and securely attached to stopper 170.

Protective circuit board 200 is formed in a shape of a plate having the same or similar size and shape as cap plate 132 which is facing bare cell 100. Protective circuit board 200 is constructed with a protective circuit for preventing overcharge or over-discharge of the battery to insure safety of the battery. Meanwhile, the protective circuit and each of external terminals 210 are electrically connected by an electrically conductive element passing through protective circuit board 200.

Figure 12A:
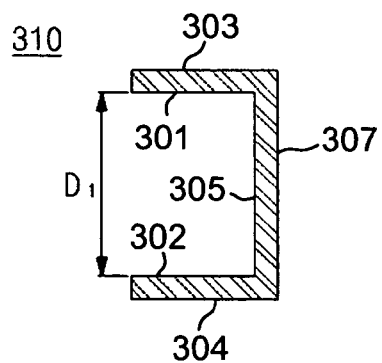
FIG. 12a is a cross-sectional view illustrating one lead plate constructed for one embodiment of the principles of the present invention.
Figure 12B:
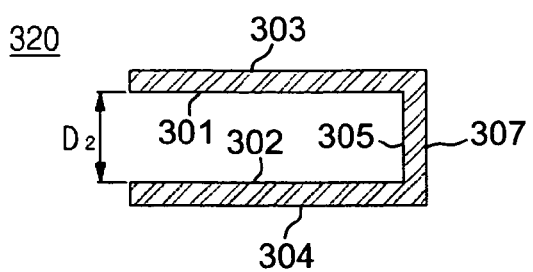
FIG. 12b is a cross-sectional view illustrating another lead plate constructed for one embodiment of the principles of the present invention.

The lead plate contemplates an anode lead plate 310 and a cathode lead plate 320 as shown in FIGS. 12a and 12b, respectively. As is shown by FIG. 9a, anode lead plate 310 is electrically connected to protective circuit board 200, and the upper plate 303 is rotated from the orientation shown by FIG. 9a into the configuration shown by FIG. 9b to form a lower plate 304, an upper plate 303 and an intermediate plate 307 connecting plates 303, 304.

FIGS. 12a and 12b, in conjunction with FIG. 9a, FIG. 9b, and FIG. 11a, illustrate details of anode and cathode lead plates 310, 320 in their ultimate assembly configuration after the interim configuration illustrated in FIG. 9a has been rotated during the manufacturing process into the configuration illustrated by FIG. 9b, with bare cell 100 coupled with protective circuit board 200 in geometric parallel. Referring to FIG. 12a, anode lead plate 310 may be formed in a '⊏' shape, i.e., a rectangular shape with an opening at one side of the rectangle, with an upper plate 303, a lower plate 304, and a connecting plate 305 joining upper plate 303 with lower plate 304. Inner surface 301 of upper plate 303 of anode lead plate 310 is electrically connected with an electrode terminal borne by the upper, or outer surface of protective circuit board 200, while the lower surface 304 of anode lead plate 310 may be electrically connected to cap plate 132 and ultimately to anode tab 114 of bare cell 100, thereby placing cap plate 132 in electrical contact with inner surface 301 of anode lead plate 310 which is electrically connected with protective circuit board 200.

As shown in FIG. 12b, cathode lead plate 320 may also be formed in a '⊏' shape, i.e., a rectangular shape with an opening at one side of the rectangle, with an upper plate 303, a lower plate 304, and a connecting plate 305 joining upper plate 303 with lower plate 304. That is, in cathode lead plate 320 as shown in FIG. 12b, inner surface 302 of lower plate 303 contacts the lower, or under surface of protective circuit board 200, while inner surface 301 of the upper plate 303 of cathode lead plate 320 is electrically connected with an electrode terminal borne by the upper, or outer surface of protective circuit board 200, and the lower, or outer, surface of lower plate 304 of cathode lead plate 320 may be electrically connected to cap plate 132 and ultimately to cathode tab 115 of bare cell 100, thereby placing cathode tab 115 in electrical contact with the outer surface of lower plate 304 of cathode lead plate 320 which is electrically connected with protective circuit board 200 through the intermediate plate 307 and upper plate 303.

In this embodiment, the linear value of $D_1$ representing the linear distance between the under, or inside surface 301 and the outer, or outside surface of plate 304 of anode plate 310 arranged as is shown by FIG. 11a and FIG. 12a is determined by the formula:

$$D_1 = a+b+c+d \tag{1}$$

where:
  a=the cross-sectional thickness of protective circuit board 200;
  b=the cross-sectional thickness of lower, or fifth, plate 304 of cathode plate 320 illustrated by FIG. 12b;
  c=the cross-sectional thickness of the upper flange of electrode terminal 131; and
  d=the cross-sectional thickness of the inner collar of the upper flange of gasket 133;
and $D_2$ representing the linear distance between the under, or inside surface 301 of upper plate 303 and the inner, or inside surface 302 of lower plate 304 of cathode lead plate 310 arranged as is shown by FIG. 11a and FIG. 12b, is determined by the formula:

$$D_2 = a \quad (2)$$

Accordingly, the distance between bare cell 100 and protective circuit board 200 formed by the prior 'L' shape lead plate 300' as shown in FIG. 8 may be significantly reduced and the capacity per volume of battery 100 thereby improved during the practice of the foregoing principles of this invention.

Figure 10A:
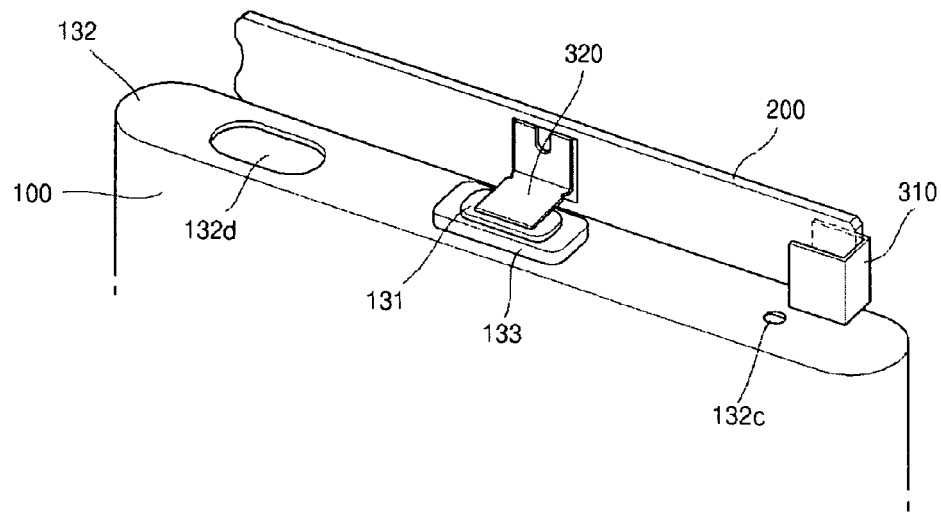
FIG. 10a is an assembly view detail illustrating a bare cell constructed according to yet another embodiment of the principles of the present invention.
Figure 10B:
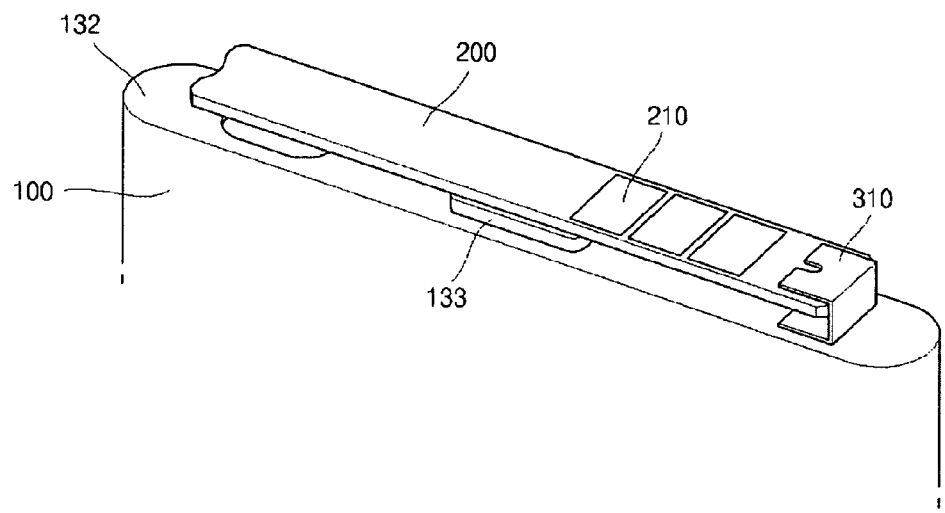
FIG. 10b is a partial oblique view illustrating a bare cell constructed according to one embodiment of the principles of the present invention.
Figure 11B:
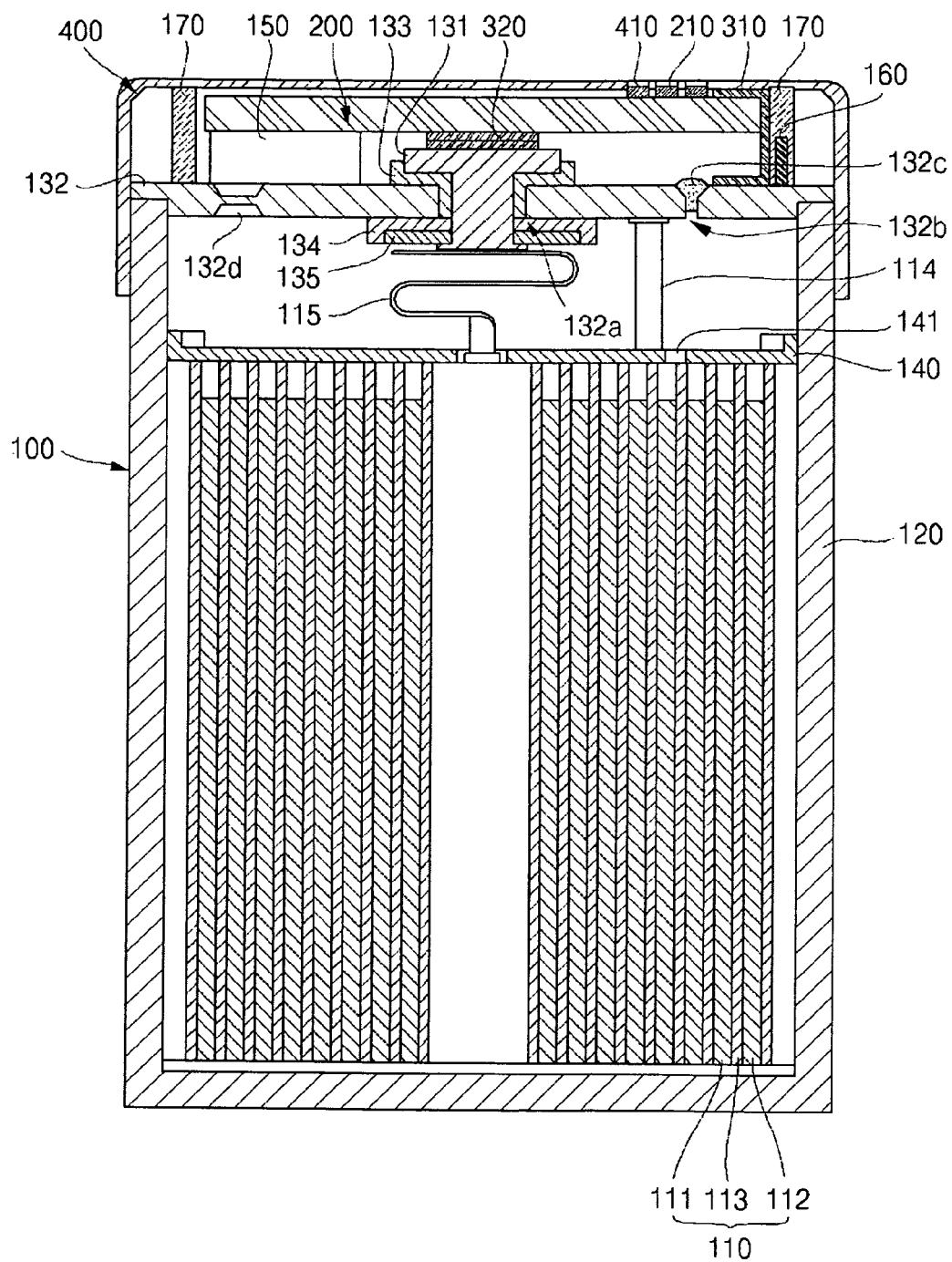
FIG. 11b is a cross-sectional elevation view illustrating a bare cell constructed according to another embodiment of the principles of the present invention.

FIG. 10a, an assembly view detail, FIG. 10b, a partial oblique view, and FIG. 11b, a cross-sectional elevation view, illustrate a bare cell constructed according to still another embodiment of the principles of the present invention that incorporate alternative aspects and features into the fabrication of a rechargeable battery constructed with a bare cell 100, a protective circuit board 200 electrically connected to bare cell 100, and lead plates 310, 320 for electrically connecting bare cell 100 to protective circuit board 200. Combining case 400 covers the upper end of bare cell 100, protective circuit board 200 and lead plates 310, 320.

A cap assembly is constructed with a flat type cap plate 132 having a size and a shape that is similar to the upper end opening of can 120. Electrolytic solution injection hole 132b is formed in one side of cap plate 132 and a sealing cap 132c is disposed to seal electrolytic solution injection hole 132b after the injection of the electrolytic solution. Sealing cap 132c may be a ball-member made from aluminum or aluminum-containing metal. Sealing cap 132c is disposed in electrolytic solution injection hole 132b and is mechanically pressed in electrolytic solution injection hole 132b. In addition, sealing cap 132c may be welded to cap plate 132 along the circumference of electrolytic solution injection hole 132b. Safety vent 132d is formed on the other side of cap plate 132. Safety vent 132d is configured to be broken to prevent an ignition or an explosion of the battery when the internal pressure of the battery rises over a predetermined level.

Insulation filling member 150 may be placed on at least a part of the space between bare cell 100 and protective circuit board 200. Insulation filling member 150 fills the space between bare cell 100 and protective circuit board 200 and prevents protective circuit board 200 from being moved or deformed due to a bending phenomenon caused by an external force. Further, insulation filling member 150 improves the insulation between bare cell 100 and protective circuit board 200. Insulation filling member 150 may be disposed on cap plate 132, and may be made from an insulation tape; that insulation tape may be made from a polyethylene (PE) sheet.

Stopper 170 is mounted on cap plate 132 in order to prevent protective circuit board 200 from being deformed by the pressure of combining case 400 when cap plate 132 is covered with combining case 400. Meanwhile, stopper 170 may be formed integrally with cap plate 132 or may be coupled to cap plate 132.

When stopper 170 is connected to cap plate 132, a supporting member 160 is coupled to cap plate 132, and a groove may be formed inside stopper 170 so that supporting member 160 is inserted into stopper 170 and securely attached to stopper 170.

Protective circuit board 200 may be formed in a shape of a plate having the same or similar size and shape as cap plate 132 which is facing bare cell 100. Protective circuit board 200 is constructed with a protective circuit for preventing overcharge or over-discharge of the battery to insure safety of the battery. The protective circuit and each of external terminals 210 are electrically connected by an electrically conductive element passing through protective circuit board 200.

Figure 13A:
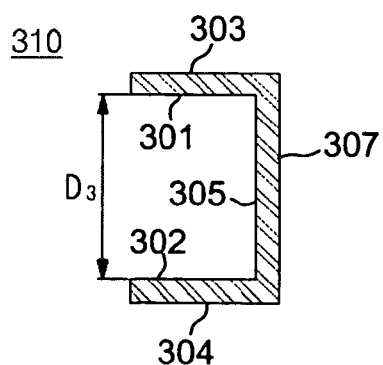
FIG. 13a is a cross-sectional view illustrating one lead plate constructed for another embodiment of the principles of the present invention.
Figure 13B:
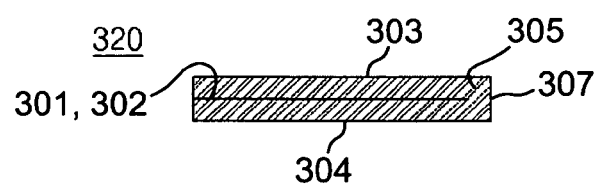
FIG. 13b is a cross-sectional view illustrating another lead plate constructed for another embodiment of the principles of the present invention.

Alternatively, the lead plate contemplates an anode lead plate 310 and a cathode lead plate 320 as shown in FIGS. 13a and 13b, respectively. As is shown by FIG. 10a, anode lead plate 310 is electrically connected to protective circuit board 200, and the upper plate 303 is rotated from the orientation shown by FIG. 10a into the configuration shown by FIG. 10b to form a lower plate 304, an upper plate 303 and an intermediate plate 307 connecting plates 303, 304.

FIGS. 13a and 13b, in conjunction with FIG. 10a, FIG. 10b, and FIG. 11b, illustrate details of anode and cathode lead plates 310, 320 in their ultimate assembly configuration after the interim configuration illustrated in FIG. 10a has been rotated during the manufacturing process into the configuration illustrated by FIG. 10b, with bare cell 100 coupled with protective circuit board 200 in geometric parallel. Referring to FIG. 13a, anode lead plate 310 may be formed in a '⊏' shape, i.e., a rectangular shape with an opening at one side of the rectangle, with an upper plate 303, a lower plate 304, and a connecting plate 305 joining upper plate 303 with lower plate 304. Inner surface 301 of upper plate 303 of anode lead plate 310 is electrically connected with an electrode terminal borne by the upper, or outer surface of protective circuit board 200, while the lower surface 304 of anode lead plate 310 may be electrically connected to cap plate 132 and ultimately to anode tab 114 of bare cell 100, thereby placing cap plate 132 in electrical contact with inner surface 301 of anode lead plate 310 which is electrically connected with protective circuit board 200.

As shown in FIG. 13b, cathode lead plate 320 may also be formed in a '⊏' shape, i.e., a rectangular shape with a very limited opening at one side of the rectangle, with an upper plate 303, a lower plate 304, and a connecting plate 305 joining upper plate 303 with lower plate 304. That is, in cathode lead plate 320 as shown in FIG. 13b, inner surface 302 of upper plate 303 contacts the lower, or under surface 301 of upper plate 303, and is thus positioned between protective circuit board 200 and electrode terminal 131, where the outer surface of upper plate 301 of cathode lead plate 320 is electrically connected with an electrode terminal borne by the lower, or under surface of protective circuit board 200, and the lower, or outer, surface of lower plate 304 of cathode lead plate 320 may be electrically connected to electrode tab 115 of bare cell 100, thereby placing cathode tab 115 in electrical contact with the outer surface of lower plate 304 of cathode lead plate 320 which is electrically connected with protective circuit board 200 through the intermediate plate 307 and upper plate 303.

In this alternative embodiment, the linear value of $D_3$ representing the linear distance between the under, or inside surface 301 and the outer, or outside surface of plate 304 of anode lead plate 310 arranged as is shown by FIG. 11a and FIG. 12a is determined by the formula:

$$D_3 = a + b + c + d \quad (3)$$

where:
- a = the cross-sectional thickness of protective circuit board 200;
- b = the cross-sectional thickness of cathode lead plate 320 illustrated by FIG. 13b;
- c = the cross-sectional thickness of the upper flange of electrode terminal 131; and
- d = the cross-sectional thickness of the inner collar of the upper flange of gasket 133.

Accordingly, in the practice of this embodiment, the distance between bare cell 100 and protective circuit board 200 formed by the prior 'L' shape lead plate 300' as shown in FIG. 8 may also be significantly reduced and the capacity per volume of battery 100 thereby improved during the practice of the foregoing principles of this invention.

The anode lead plate is constructed with a first plate electrically connected to an outside surface of the protective circuit board, a second plate electrically connected to the bare cell, and an inside bending part connected between the first plate and the second plate. The cathode lead plate may be alternatively positioned to have inner surfaces 301, 302 of spaced-apart flanges of upper and lower plates 303, 304 engaging opposite sides of a protective circuit board while an outer surface of the lower plate 304 makes and electrical contact with electrode terminal 131, or in the alternative, positioned to have outer surfaces of spaced-apart flanges of upper and lower plates 303, 304 interposed between a lower side of a protective circuit board and electrode terminal 131; while an inner surface 301 of upper plate 303 of anode lead plate 310 operationally engages an electrical lead borne by the outer, or upper, surface of protective circuit board 200 and the outer, or lower, surface of lower plate 304 of anode lead plate 310 electrically contacts cap plate 132. During assembly, the first plate of the lead plate is bent around the inside bending part 307 at 180 degrees such that the bare cell is coupled with the protective circuit board, and are firmly held in geometric parallel. Therefore, the distance between the bare cell and the protective circuit is reduced, and the capacity per volume of the rechargeable battery is increased. As described above, the rechargeable battery according to the present invention produces the following effects.

First, the distance between the bare cell and the protective circuit board is reduced by changing the shape and structure of the lead plate, thereby allowing the capacity per volume of the battery to be increased.

Secondly, the battery is manufactured by using the combining case, instead of using the melting method of the molded resin in the prior art, and thereby improving productivity by simplifying the manufacturing process of the battery, and preventing the possibility of the short circuit caused by contacting with the mold, the explosion due to molding and deformation during the bending process.

Thirdly, the insulation filling member is installed on the cap plate so as to enhance the insulation between the cap plate and the protective circuit board that are close to each other. Further, deformation of the protective circuit board can be prevented by preventing the protective circuit board from being pressurized by the combining case by mounting the stopper.

It will be understood by those ordinary skilled in the art that the present invention is not limited to the specific embodiments thereof or the drawings and various replacements, modifications and changes in the form and details may be made therein without departing from the spirit and scope of the present invention.

What is claimed is:

1. A rechargeable battery, comprising:
   a bare cell;
   a protective circuit board electrically connected to the bare cell; and
   one of a plurality of lead plates being bent such that the bare cell is coupled with the protective circuit board in parallel, and having first and second plates, the first plate being connected to the bare cell, and the second plate being disposed on an outer surface of the protective circuit board opposite to an inner surface of the protective circuit board facing the bare cell.

2. The rechargeable battery of claim 1, wherein the one of a plurality of lead plates has a third plate, the third plate disposed along an edge of the protective circuit board, electrically connects the first plate and the second plate and maintains a space between the first plate and the second plate.

3. The rechargeable battery of claim 2, wherein the third plate disposed along a short edge of the protective circuit board, electrically connects the first plate and the second plate and maintains a space between the first plate and the second plate.

4. The rechargeable battery of claim 2, wherein the first plate is connected to a cap plate of the bare cell.

5. The rechargeable battery of claim 1, further comprising a safety device electrically coupled in series between the bare cell and the first plate.

6. The rechargeable battery of claim 5, wherein the safety device comprises a positive temperature coefficient (PTC) element.

7. The rechargeable battery of claim 1, wherein another one of the plurality of lead plates is connected between the bare cell and the protective circuit board.

8. The rechargeable battery of claim 1, wherein another one of the plurality of lead plates connected between the bare cell and the outer surface of the protective circuit board.

9. The rechargeable battery of claim 1, wherein another one of the plurality of lead plates connected between the bare cell and the protective circuit board, and having fourth and fifth plates, the fourth plate being connected to the bare cell, and the fifth plate being disposed on the outer surface of the protective circuit board.

10. The rechargeable battery of claim 9, wherein the another one of a plurality of lead plates has a sixth plate, the sixth plate disposed along an edge of the protective circuit board, electrically connects the fourth plate and the fifth plate and maintains a space between the fourth plate and the fifth plate.

11. The rechargeable battery of claim 9, wherein the fourth plate is connected to an electrode terminal of the bare cell.

12. The rechargeable battery of claim 1, further comprising another one of the plurality of lead plates connected between the bare cell and the inner surface of the protective circuit board.

13. The rechargeable battery of claim 1, further comprising another one of the plurality of lead plates connected between the bare cell and the protective circuit board, and having fourth and fifth plates connected together, the fourth plate being connected to the bare cell, and the fifth plate being disposed on the inner surface of the protective circuit board.

14. The rechargeable battery of claim 13, wherein the fourth plate is connected to an electrode terminal of the bare cell.

15. The rechargeable battery of claim 1, comprised of:
   the one of the plurality of lead plates comprising an third plate positioned to connect the first plate to the second plate and to maintain a first distance of separation between the first plate and the second plate; and
   another one of the plurality of lead plates comprising a fourth plate joined to a fifth plate, connected between an electrode terminal of the bare cell and the outer surface of the protective circuit board, with any distance of separation between the fourth plate and the fifth plate being not greater than the first distance.

16. The rechargeable battery of claim 1, comprised of:
   the one of the plurality of lead plates comprising an third plate positioned to connect the first plate to the second plate and to maintain a first distance of separation between the first plate and the second plate; and
   another one of the plurality of lead plates comprising a fourth plate joined to a fifth plate, connected between an electrode terminal of the bare cell and the inner surface of the protective circuit board, with any distance of separation between the fourth plate and the fifth plate being not greater than the first distance.

17. The rechargeable battery of claim 1, further comprised of:
the one of the plurality of lead plates comprising a positive lead plate with the first plate connected to a cap plate of the bare cell; and
another one of the plurality of lead plates connected between an electrode terminal of the bare cell and the outer surface of the protective circuit board.

18. The rechargeable battery of claim 1, further comprised of:
the one of the plurality of lead plates comprising a positive lead plate with the first plate connected to a cap plate of the bare cell; and
another one of the plurality of lead plates connected between an electrode terminal of the bare cell and the inner surface of the protective circuit board.

19. The rechargeable battery of claim 1, further comprised of:
the first and second plates of the one of the plurality of lead plates being bent around an intermediate plate by 180 degrees; and
another one of the plurality of lead plates connected between an electrode terminal of the bare cell and the outer surface of the protective circuit board.

20. The rechargeable battery of claim 19, wherein the another one of the plurality of lead plates is bent by 180 degrees.

21. The rechargeable battery of claim 1, further comprised of:
the first and second plates of the one of the plurality of lead plates being bent around an intermediate plate by 180 degrees; and
another one of the plurality of lead plates connected between an electrode terminal of the bare cell and the inner surface of the protective circuit board.

22. The rechargeable battery of claim 21, wherein the another one of the plurality of lead plates is bent by 180 degrees.

23. A rechargeable battery, comprising:
a bare cell;
a protective circuit board electrically connected to the bare cell; and
at least one of a plurality of lead plates having a C-shape keeping the bare cell coupled to the protective circuit board in parallel, and having first and second plates connected together, the first plate being connected to the bare cell, and the second plate being connected to the protective circuit board, with the protective circuit board being positioned between the first and second plates.

24. The rechargeable battery of claim 23, further comprised of:
the one of the plurality of lead plates comprising an intermediate plate joining the first plate to the second plate and maintaining a first distance of separation between the first plate and the second plate; and
another one of the plurality of lead plates comprising a third plate joined to a fourth plate, connected between an electrode terminal of the bare cell and an outer surface of the protective circuit board, with any distance of separation between the third plate and the fourth plate being not greater than the first distance.

25. The rechargeable battery of claim 23, further comprised of:
the one of the plurality of lead plates comprising an intermediate plate joining the first plate to the second plate and maintaining a first distance of separation between the first plate and the second plate; and
another one of the plurality of lead plates comprising a third plate joined to a fourth plate, connected between an electrode terminal of the bare cell and the inner surface of the protective circuit board, with any distance of separation between the third plate and the fourth plate being not greater than the first distance.

26. The rechargeable battery of claim 23, further comprised of:
the first and second plates of the plurality of lead plates being bent around an intermediate plate by 180 degrees; and
another one of the plurality of lead plates connected between an electrode terminal of the bare cell and an outer surface of the protective circuit board.

27. The rechargeable battery of claim 23, further comprised of:
the first and second plates of the plurality of lead plates being bent around an intermediate plate by 180 degrees; and
another one of the plurality of lead plates connected between an electrode terminal of the bare cell and an inner surface of the protective circuit board.

* * * * *